UNITED STATES PATENT OFFICE.

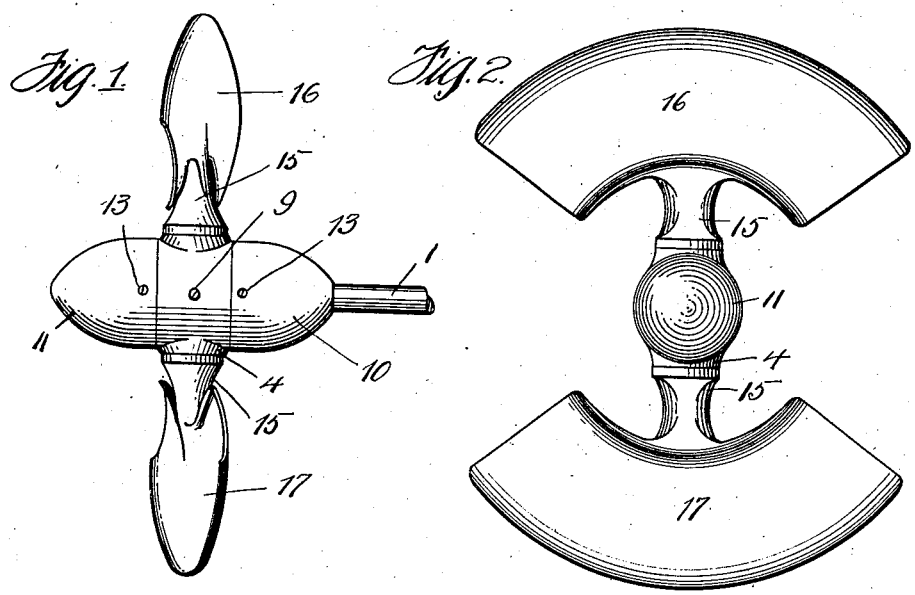

SIMON YEAGER, OF CRAFTON, PENNSYLVANIA.

PROPELLER.

945,663.

Specification of Letters Patent. Patented Jan. 4, 1910.

Application filed May 7, 1909. Serial No. 494,550.

*To all whom it may concern:*

Be it known that I, SIMON YEAGER, a citizen of the United States of America, residing at Crafton, in the county of Allegheny and State of Pennsylvania, have invented certain new and useful Improvements in Propellers, of which the following is a specification, reference being had therein to the accompanying drawing.

This invention relates to propellers, and the invention has for its primary object to provide a propeller with adjustable blades than can be easily and quickly set at different inclinations, according to the speed desired from the propeller when revolved through the medium of the driven shaft.

Another object of the invention is to provide a propeller with adjustable segment-shaped blades, from which a high degree of efficiency can be obtained from a minimum expenditure of power.

These and such other objects as may hereinafter appear are attained by a propeller particularly designed for motor boats and similar vessels, but is applicable, when constructed upon a larger scale, to ocean liners and large ships.

The propeller will be hereinafter considered in detail, and then claimed, and reference will now be had to the drawings forming a part of this specification, wherein there is illustrated a preferred embodiment of the invention, but it is to be understood that the structural elements thereof can be varied or changed, as to the size, shape, and manner of assemblage without departing from the scope of the claim hereunto appended.

In the drawings, Figure 1 is a side elevation of the propeller, Fig. 2 is a rear elevation of the same, Fig. 3 is a plan of the propeller, Fig. 4 is a longitudinal sectional view of a portion of the propeller, and Fig. 5 is a rear elevation of a three-bladed propeller.

To put my invention into practice, I provide a driven shaft 1 with a cylindrical hub 2, having the ends thereof exteriorly screw threaded, as at 3. The hub 2 intermediate the ends thereof is provided with a peripheral enlargement or collar 4, and this collar is provided with diametrically opposed cylindrical openings 5, the inner ends of said openings terminating in the tapering bore 6 of the hub 2. This tapering bore 6 receives the tapering end 7 of the driven shaft 1 and the hub 2 can be secured upon the tapering end 7 by a longitudinal key 8, or by a set screw 9, and in some instances, the set screw can be used in conjunction with the key 8 as an additional fastening means for retaining the hub upon the shaft 1.

Detachably mounted upon the threaded ends of the hub 2 are cone-shaped caps 10 and 11, the former having a central opening 12 providing clearance for the shaft 1. These caps 10 and 11 can be locked upon the hub 2 by set screws 13.

Fitting in the openings 5 of the hub 2 are the cylindrical stems 14 of the blade shanks 15, said shanks having segment shaped blades 16 and 17. The shanks 15 are provided with peripheral grooves 18, and adapted to engage in said grooves are set screws 19 adjustably mounted in the rear end of the hub 2, said set screws fixing the blades 6 and 7 at different inclinations relative to the hub 2. The shanks 15 bear upon the collar 4 limiting the inward movement of the stems 14, and these stems are of a less length than the openings 5, in order not to contact with the tapering end 7 of the shaft 1. The blades 16 and 17 are concavo-convex and their particular shape is conducive to deflecting water with a minimum degree of retardation when the blades are set at a desired angle and revolved through the medium of the shaft 1.

With the blades set at the angle shown in Fig. 3 of the drawings, a low speed can be obtained; but with the blade 16 set at a greater angle relative to the blade 17, a high speed can be obtained. This adjustment of the blades is accomplished by removing the cap 11, releasing the set screws 19 from engagement with the stems 14, setting the blades at a desired angle or inclination, tightening the set screws 19 and then replacing the cap 11. All of this can be accomplished without necessarily removing the propeller from a body of water.

As shown in Fig. 5 of the drawings, the hub 2 can be provided with two or more blades, and each blade can be independently adjusted. It is obvious that the propeller can be used in connection with aero-planes, dirigible balloons, and similar air crafts.

Having now described my invention what I claim as new, is:—

In a propeller, the combination with a driven shaft, of a hub mounted upon said shaft, shanks having stems adjustably mounted in said hub, said shanks of greater diameter than said stems, each of said stems provided with a peripheral continuous groove and each of said shanks engaging the outer face of the hub, a segment-shaped blade carried by each stem, a set screw engaging in the groove of each stem for connecting it to said hub, and cone-shaped caps detachably mounted upon the ends of said hub, one of said caps having an opening formed therein providing clearance for said shaft.

In testimony whereof I affix my signature in the presence of two witnesses.

SIMON YEAGER.

Witnesses:
A. J. TRIGG,
C. V. BROOKS.